US005672373A

United States Patent [19]
Miller

[11] Patent Number: 5,672,373
[45] Date of Patent: Sep. 30, 1997

[54] METHOD OF PRODUCING ANHYDROUS WHOLE MILK POWER HAVING FULL FAT RECOVERY FOR FURTHER USE

[76] Inventor: Van Miller, R.R. #2, Brisbane, Erin, Ontario, Canada, N0B 1T0

[21] Appl. No.: 543,571

[22] Filed: Oct. 16, 1995

[51] Int. Cl.⁶ ........................................ A23C 9/16
[52] U.S. Cl. .................... 426/588; 426/417; 426/443; 426/491; 426/492; 426/519
[58] Field of Search .................. 426/417, 443, 426/491, 492, 519, 520, 585, 588, 580

[56] References Cited

U.S. PATENT DOCUMENTS

| | | | |
|---|---|---|---|
| 2,966,409 | 12/1960 | Williams et al. | 426/588 |
| 3,773,519 | 11/1973 | Pisecky et al. | 426/584 X |
| 3,892,880 | 7/1975 | Grolitsch | 426/588 X |
| 4,855,157 | 8/1989 | Tashiro et al. | 426/631 X |

OTHER PUBLICATIONS

Potter et at., Food Science, fifth edition, pp. 290–292 1986.
Article "Spray dried whole milk powder . . . ", S.O. Hansen & P.S. Hansen, pp. 79 through 82, Scandanavian Dairy Information, Feb. 1990.
Article "The Influence of Milk Fat . . . ", G. Hogenbirk, pp. 53 through 60, Proceeding of 44th P.M.C.A. Production Conference, 1990.
Article "Incorporation of Milkfat . . . ", C.M. Barna, R.W. Hartel & S. Metin, pp. 62 through 71, Proceedings of P.M.C.A. Production Conference, 1992.

*Primary Examiner*—Milton Cano
*Attorney, Agent, or Firm*—Donald E. Hewson

[57] ABSTRACT

Anhydrous milk powder is prepared to have substantially the same constituent ingredients as dry whole milk powder that is manufactured using conventional processes, except that 100% of the fat constituent is available as fat. Whole milk is first separated into skim milk and anhydrous butter fat; the skim milk is dried by removing all of the available free water therefrom; and the resultant anhydrous skim milk powder solids are combined in a selected amount together with a further selected amount of the separated anhydrous butter fat constituent in a ribbon blender. The resultant blended product has the same constituent make-up as ordinary dry whole milk, but all of the fat constituent is recoverable as fat. The anhydrous milk powder of the present invention is intended primarily for use by the chocolate industry, in the manufacture of milk chocolate, but may also be utilized for other purposes such as the manufacture of dry baking mixes, or other prepared foods, where the dry whole milk powder is not to be rehydrated.

11 Claims, 1 Drawing Sheet

METHOD OF PRODUCING ANHYDROUS WHOLE MILK POWER HAVING FULL FAT RECOVERY FOR FURTHER USE

FIELD OF THE INVENTION

This invention relates to methods and apparatus for the production of dry whole milk powder. In particular, the invention is directed to the production of dry whole milk powder having a fat constituent that is entirely recoverable and useable as fat in subsequent purposes and formulations into which dry whole milk powder is generally incorporated. The most usual of such purposes, and that for which this invention is primarily intended, is the use of the dry whole milk powders hereof in the production of milk chocolate. Other purposes are also contemplated, such as the production of dry baking mixes.

BACKGROUND OF THE INVENTION

Dry whole milk powder is derived from whole milk, and may be used for a great variety of purposes. The dry whole milk powder equivalent products which are provided by the present invention are, however, specifically intended for use in industries where dry whole milk powder is mixed into or added into the formulation of other food products without first being rehydrated. While such purposes may generally include bakery products such as dry baking mixes for preparation of home-made cakes and the like, or other food products, the principal purposes for which the anhydrous milk powders of the present invention are particularly intended is in the chocolate industry, for the production of milk chocolate.

Chocolate is a food substance which comprises chocolate liqueur and cocoa butter, both derived from cocoa beans, and sugar. When milk chocolate is prepared, however, the formulation includes milk solids as well. In order for the designation "Milk Chocolate" to be applied, however, there must be no less than 12% of milk solids included in the milk chocolate formulation. The fat system in the milk chocolate is the combination or blend of the cocoa butter together with the butter fat carried into the chocolate formulation by dry whole milk powder.

A particular problem that faces the chocolate maker is that only a certain amount of fat is available from the dry whole milk powder which has been manufactured using traditional methods for production thereof, for entry into the chocolate formulation as fat constituent. Indeed, only about 60% of the fat content of conventional dry whole milk powder is available for fat extraction, and entry into the chocolate formulation as fat. Most, but not necessarily all, of the remaining butter fat may later be recovered, after the dry whole milk powder is incorporated into the chocolate formulation, by mechanical means such as squeezing the fat away from the dry whole milk powder using roller refiners and conching the product.

Dry whole milk is defined in the United States Food and Drug Administration Regulations at 21 C.F.R. § 131.147(a); and requires that dry whole milk is obtained by removal of water only from pasteurized milk. However, it should be noted that the present inventor has determined, as discussed in greater detail hereafter, that it is not necessary to pasteurize the whole milk which is the starting material from which anhydrous milk powders of the present invention are made.

The Food and Drug Administration definition of dry whole milk also provides an alternative description, by stating that dry whole milk may be obtained by blending fluid, condensed, or dried non-fat milk with liquid or dried cream or with fluid, condensed, or dried milk, as appropriate. The resulting dry whole milk must be equivalent in composition to that which is obtained by removal of water only from pasteurized milk.

In any event, dry whole milk, according to the Food and Drug Administration definition thereof, contains the lactose, milk proteins, milk fat, and milk minerals, in the same relative proportions to one another as the milk from which it was made. The dry whole milk must contain not less than 26% by weight but less than 40% by weight of milk fat, on an as is basis. Moreover, dry whole milk must contain not more than 5% by weight of moisture on a milk solids not fat basis. This is a clear demonstration that it is recognized that not all of the milk fat (as that term is used) is available, but that a certain portion of the fat content must nonetheless be present.

There have generally been two different processes carried out in the past, and still presently, for the preparation of whole dry milk powder. These are generally referred to as roller drying, and spray drying: although a third method of freeze-drying is also available, it is not generally practised because of the high energy requirements. The effect of either roller drying or spray drying is, in any event, to use heat to evaporate the water constituent of whole milk and remove it as steam. In so doing, however, a considerable portion—usually no less than about 40% of the fat constituent found in whole milk—becomes encapsulated in the serum solids or, in other words, in the lactose and protein constituents of the mill, and cannot be removed therefrom. Moreover, a small portion of water, sometimes up to 5% may be also encapsulated or bound in the protein constituent of the mill and, therefore, cannot be removed from it. However, since that moisture is bound, and is not free, it is not noticeable as moisture and, therefore, the dry product is properly termed as being anhydrous.

By the same token, the 40% or so of the fat constituent which is encapsulated in the serum products of the dry whole mill can not easily be removed so as to become available as fat. What that means is that, as the dry whole mill enters into the formulation of the food product such as milk chocolate, the unrecoverable fat is not available to enter the fat system and to be available as fat during further preparation steps. It can only be made available by further, mechanical processing steps, whereby the fat is effectively squeezed out of its encapsulation carriers to be carried into the formulation for use as fat. That is accomplished by passing the blended cocoa butter and chocolate liqueur, sugar, and dry whole milk, between closely spaced rollers so as to refine or conch the product. The same may also be true during the preparation of dry baking mixes and the like.

If the product is not fully refined or conched, and there is still a requirement for a specified amount of fat to be available as fat in the food product formulation, especially when the food product is mill chocolate, then there may in fact be a higher amount of fat present in the food product than is usable. That unusable fat nonetheless enters the body of the person consuming the food product as fat nutrient. Still further, of course, that unavailable fat constituent does not enter into the fat system with cocoa butter, for example, as mill chocolate is being prepared. It must not be overlooked that mill chocolate is a suspension, in which the mill solids and sugar are suspended in a fat system. As noted above, in mill chocolate, the fat system comprises the available butter fat together with the cocoa butter.

Indeed, the question of the availability of fat from dry whole milk, and the fact that not all of the fat constituent of the dry whole milk is available, is discussed at the first page of a paper entitled "*The Influence of Milk Fat on the Crystallization Properties of Cocoa Butter and Cocoa Butter Alternatives*" presented in the Proceedings of 44th P.M.S.A. Production Conference, 1990, at pages 53 through 60, by Gerard Hogenbirk. In that paper, it is stated that the particular experiments being described are based on 99.8% pure milk fat being used, because in full cream milk powder, meaning in other words in dry whole milk powder, part of the milk fat is bound and the amount of free fat can vary from one situation to the other. Still further, the paper states that it is difficult to determine free versus bound milk fat, but gives tables that could be useful in practical situations as opposed to laboratory conditions, making corrections for the percentages of free fat and bound fat for the milk powders involved.

It follows, therefore, that the chocolate industry, in particular, recognizes the difficulties in formulating milk chocolate when not all of the fat from the dry whole milk powder constituent being used is available as fat. Unexpectedly, however, the present inventor has discovered that, if the fat is separated from whole milk in the first instance, and the resulting skim milk is then dried so as to remove all of the water except any small amount of bound water which can not otherwise be removed, and then the fat is added once again to the skim milk powder, then the fat enters into the resultant dry whole milk powder being manufactured as a totally freely available and recoverable fat constituent, with no bound fat being carried into the milk chocolate or other food product, composition, or formulation. It should be noted that, in the production of milk chocolate, the available butter fat from the whole milk powder which is added to the chocolate formulation is miscible with the cocoa butter and blends with it so as to form the fat system of the milk chocolate. Although the cocoa butter and the butter fat have quite dissimilar characteristics, they may be tempered in similar fashion at specific tempering temperatures and dwell times for the required chocolate characteristics of hardness and snap, and they do not form a eutectic within which various fat crystal structures can be detected with the desired characteristics being available only within very narrow ranges. In other words, the compatibility as to crystalline structure and as to hardness between butter fat and cocoa butter are important to the chocolate maker.

Still further, quite unexpectedly, the present inventor has determined that compatible vegetable oils may be used to replace at least a portion of the anhydrous butter fat constituent that is re-added or blended back with the dry skim milk powder in preparation of the anhydrous whole milk powder in keeping with the present invention. Provided that the vegetable oil is compatible so that it may conform to a chosen solid fat index (SFI) curve, and has a high degree of crystalline compatibility and hardness compatibility with cocoa butter in the same manner that butter fat does, a compatible vegetable oil may be used. Still further, the compatible vegetable oil would be chosen so that, as it blends with the butter fat constituent, and then blends with the cocoa butter constituent, eutectic formation within the fat system is avoided.

SUMMARY OF THE INVENTION

So as to provide for the production of anhydrous milk powder which has a fat constituent equivalent to that of dry whole milk, but from which substantially all of that fat constituent is recoverable as fat when the anhydrous milk powder is blended as dry whole milk powder into milk chocolate or dry baking mixes, the present invention provides a method for production of the anhydrous milk powder, comprising the following steps: First, unhomogenized whole milk is obtained. The whole milk, as always, has butter fat, water, lactose, and protein constituents; there may, of course, be trace amounts of minerals, as well. The butter fat constituent is extracted from the whole milk leaving, therefore, the water, lactose, and protein constituents thereof as skim milk. The extracted butter fat constituent is stored at temperatures below 40° C., as anhydrous recoverable fat constituent.

Then, the skim milk, which remained after the butter fat constituent has been removed, is dried, by removing all of the available free water constituent therefrom. This leaves anhydrous skim milk powder solids which comprise the lactose and protein constituents of the whole milk, and there may also be bound water remaining in the lactose and protein constituents, as well.

The anhydrous milk powder of the present invention is then manufactured by placing a selected amount of the anhydrous skim milk powder solids into a ribbon blender, heating a selected amount of the anhydrous recoverable fat constituent to a temperature above 40° C. so as to render the anhydrous fat into an anhydrous oil, and adding that selected amount of heated anhydrous oil also into the ribbon blender, over time. During that time, the anhydrous skim milk powder and the anhydrous oil as it is being added thereto is slowly agitated in the ribbon blender; and the agitation is continued until the selected amount of anhydrous skim milk powder and the selected amount of anhydrous oil are thoroughly blended together. The blended mixture is then removed from the ribbon blender and permitted to cool down at least to room temperature, and thus the anhydrous oil has been substantially solidified as anhydrous fat within the blended mixture. Obviously, that anhydrous fat is not bound in any way with the anhydrous skim milk powder with which it has been blended, and it is therefore fully recoverable as fat constituent when the anhydrous milk powder of the present invention is further utilized. Finally, the blended mixture is set aside for use in the same manner as dry whole milk powder; and, as noted, the blended mixture is now available for use as dry whole milk powder from which substantially of the anhydrous fat constituent is recoverable as fat.

Further variations and additions steps in keeping with the methods of the present invention are discussed in greater detail hereafter. However, it should be noted that the unhomogenized whole milk from which the processes of the present invention began initially comprises about 88%±3% by weight of water, about 3.8%±1% by weight of lactose, about 5.2%±1.2% by weight of protein, and about 3% to 6% by weight of butter fat constituent. There may be, additionally, trace amounts of minerals.

The dry whole milk powder from which substantially all of the anhydrous fat constituent thereof is recoverable, in keeping with the present invention, comprises from not less than 26% nor more than 40% by weight of butter fat constituent, from 0% up to about 4% by weight of bound water which is bound into the protein constituent of the dry whole milk powder, with the balance of up to 74% by weight being dry non-fat skim milk solids including milk proteins, lactose, and trace amounts of minerals.

In this case, therefore, the anhydrous whole milk powder in keeping with the present invention generally falls within the definition thereof as set forth by the Food and Drug Administration definition noted above, except that the 26% by weight up to 40% by weight of milk fat is present not on an as is basis, but is present as fully recoverable fat constituent.

Another aspect of the present invention provides apparatus for the product of anhydrous milk powder in keeping with the present invention, which apparatus comprises the following:

Extraction means for extracting the anhydrous butter fat constituent from unhomogenized whole milk, so as to obtain skim milk having water, lactose, and protein constituents; storage means for storing the extracted anhydrous butter fat constituent at temperatures below 40° C.; drying means for removing all of the available free water constituent from the skim milk, so as to leave anhydrous skim milk powder solids; and storage means for storing the anhydrous skim milk powder solids. There is also provided means for measuring and thereby obtaining a selected amount of the anhydrous skim milk powder solids, and means for measuring and thereby obtaining a selected amount of the stored extracted anhydrous butter fat constituent, together with heating means to heat the anhydrous butter fat constituent to a temperature of greater than 40° C. and thereby render it into anhydrous butter oil. A ribbon blender is provided, having spray nozzles for blending the selected amounts of anhydrous skim powder and anhydrous butter fat constituent, together with means for removing a blended mixture thereof away from the ribbon blender, and means for cooling, storage, and handling the blended mixture.

In general, the butter fat constituent is extracted from the unhomogenized whole milk using a centrifuge. Also, in general, the remaining skim milk is dried using a spray drier. Other apparatus may, however, be used, as noted below.

BRIEF DESCRIPTION OF THE DRAWINGS

The present invention will now be described, with various alternative embodiments given by way of example only, in association with the accompanying drawings in which:

The single Figure is a schematic layout showing the principal components of the apparatus used for production of anhydrous milk powder in keeping with the present invention.

DETAILED DESCRIPTION OF THE PREFERRED EMBODIMENTS

Figure 1:
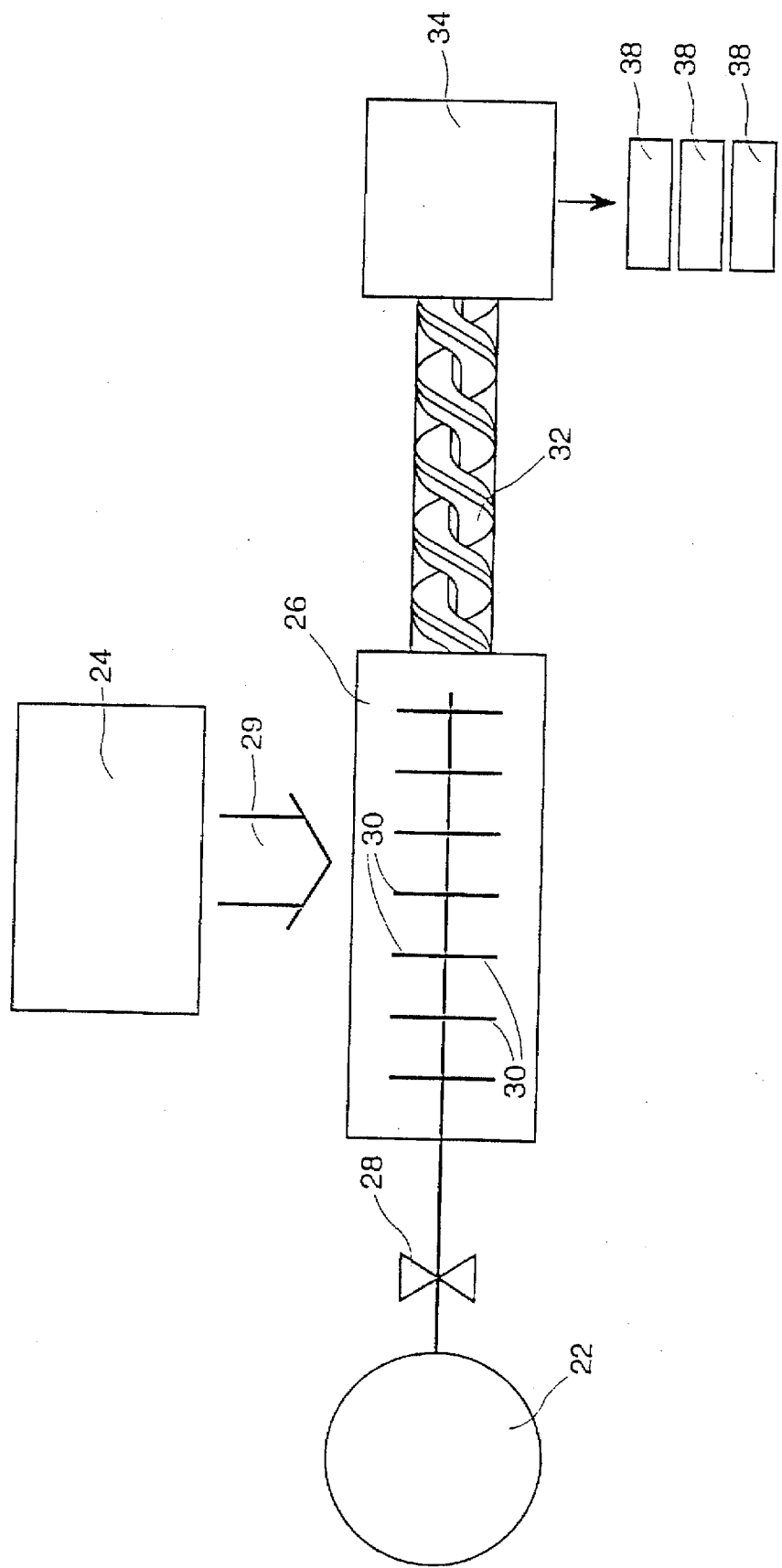

It has been noted above that there are generally two processes for the preparation of whole dry milk powder, where heat is used to evaporate the water constituent of whole milk and remove it as steam. They are roller drying, and spray drying. Both processes are well known in the milk industry, so no detailed description of either process is required. However, so as to provide at least an oversight of those processes the following commentary is made:

First, the incoming milk to be dried is tested in a direct standardization system which is outside the scope of the present invention. The milk must be tested to determine that it has not previously been subjected to high temperatures which might affect the whey protein, causing coagulation and affecting the solubility, as well as affecting the aroma and taste of the milk powder to be prepared. For roller drying, the milk is then distributed onto rotating drums that are generally steam heated. The water in the milk evaporates and the steam is drawn away from the rollers. Care must be taken that there must not be too much heat transferred to the product because discoloration may occur. A film develops on the surface of the drums, which is then scraped off. The milk may be distributed to the drum surfaces, either from a trough, or by being sprayed onto the roller dryers.

Spray drying is carried out in two stages, in the first of which milk is evaporated to a certain extent, and then the concentrate is pumped to a drying tower for final drying. Generally, the milk is dispersed or atomized into very small droplets for more effective drying. Dried milk is generally a very fine, dusty powder; and roller dried milk may be distinguished from spray dried milk, especially by its physical characteristics such as fineness and coloration.

In commercial milk powder preparation, very often dry skim milk powder is prepared because it is generally easier to dry skim milk than whole milk. In that event, the butter fat is separated from the whole milk before the drying process begins. Indeed, commercial dairies may have high demand for liquid milk and cream products having certain designated butter fat percentages, such as 2% milk, 4% milk, 6.5% cream, 10% cream, and so on. The cream or butter fat constituent that is separated at the creamery or milk production facility may then be diverted to other liquid milk and cream production and packaging lines; and the separated skim milk may, itself, be subsequently shipped by tanker truck or otherwise to another dry skim milk production facility for drying.

However, the present invention calls for separating and storing the butter fit constituent of whole milk for subsequent handling by being blended back into skim milk powder to make a cakey powder which has a specific and designated butter fat percentage; and from which the butter fat is fully recoverable because it remains as butter fat even when blended back into the dry skim milk powder to form the cakey but anhydrous milk powder of the present invention.

With reference to the single Figure of drawings, certain of the principal components of the apparatus for the production of anhydrous milk powder in keeping with the present invention are now described.

Extraction means to extract anhydrous butter fat constituent from unhomogerdzed whole milk are well known in the industry, and are not illustrated. The usual extraction means employed for those purposes is a centrifuge, but other mechanical fat-phase separators, as are well known to dairy chemists, may be employed.

In any event, as noted, the butter fat constituent is anhydrous, since only the butter fat constituent is separated or extracted from the whole milk leaving the water, lactose, protein constituents, and trace minerals, as liquid skim milk at that stage.

A storage tank or other storage means 22 is provided, for storing the extracted anhydrous butter fat constituent. The anhydrous butter fat constituent should be stored at temperatures well below 40° C., since at 40° C. the butter fat is completely melted.

Drying means are also provided; and those drying means may be roller drying means or, more usually, a spray drier, but they are well known in the milk industry. They are not illustrated. In any event, the anhydrous skim milk powder solids which result from the drying process are placed into a storage means or tank 24. There may be, as noted above, a certain percentage, usually less than 5%, of bound water found in the skim milk powder solids stored in the tank 24 but, since it is bound water, it is not free, and the skim milk powder solids remain and are properly referred to as being anhydrous.

A ribbon blender is shown generally at 26. Situated between the ribbon blender 26 and the storage tank 22, will be a pump and metering equipment whereby a specific and selected amount of the extracted anhydrous butter fat constituent may be removed from the tank 22 for delivery into the ribbon blender 26. A valve 28 will, of course, be provided, as well.

Likewise, there will be provided between the storage tank 24 and the ribbon blender 26 apparatus for measuring and obtaining a specific and selected amount of the anhydrous skim milk powder solids stored in the tank 24. That selected amount of anhydrous skim milk powder solid is dumped into the ribbon blender 26, as demonstrated by arrow 29.

Typically, the ribbon blender 26 is provided with a series of spray nozzles 30. The selected amount of extracted anhydrous butter fat constituent removed from the tank 22 is heated to a temperature greater than 40° C., and is then sprayed into the ribbon blender into which the anhydrous skim milk powder solids have already been placed. The process of spraying the heated anhydrous butter fat constituent into the ribbon blender 26 takes place over time so that, over a period of time, all of the selected amount of anhydrous butter fat constituent may be thoroughly blended into the selected amount of anhydrous skim milk powder solids.

After sufficient time, the blended cakey powder which results, and from which the anhydrous butter fat constituent may be fully recovered as fat at a later stage, may be removed from the ribbon blender 26 such as by an auger 32. The product may then move to a bagging station 34, equipped with bag filling and weighing apparatus and the like, so that specific amounts of the cakey anhydrous milk powder having the specific fat constituent added thereto may be packaged and handled for storage and shipping to consumers such as, particularly, chocolate makers. A plurality of such bagged anhydrous milk powder is shown at 38.

Typically, any ribbon blender 26 is provided with an outer jacket, through which warm or cool water may be flowed, as required. Thus, during the blending process, warm water is flowed through the jacket to keep the skim milk powder and anhydrous butter oil being blended into it at or slightly above 40° C. Then, if the ribbon blender is required almost immediately for the next batch to be prepared, the blended cakey powder is removed as noted above. Otherwise, cool water may be flowed through the jacket and the blended cakey powder cooled down before being removed.

From all of the above, and in any event, the principal steps for the method for production of anhydrous milk powder having a fat constituent equivalent to that of dry whole milk, and from which substantially all of the fat constituent is recoverable as fat when the manufactured anhydrous milk powder is blended as dry whole milk powder into milk chocolate or dry baking mixes, are as follows:

(a) First, unhomogenized whole milk is obtained. The whole milk, therefore, has the typical butter fat, water, lactose, and protein constituent of whole milk, and will generally have certain trace mounts of minerals as well.

(b) The butter fat constituent is extracted from the whole milk, thereby leaving the water, lactose, and protein constituents thereof, as skim milk.

(c) The extracted butter fat constituent is, as noted above, anhydrous; and it is stored at temperatures below 40° C. as anhydrous recoverable fat constituent.

(d) The remaining skim milk from step (b) is dried by removing all of the available free water constituent therefrom. This leaves anhydrous skim milk powder solids which comprise the lactose and protein constituents of the starting unhomogenized whole milk raw material, together with any bound water that remains in the lactose and protein constituents, and any trace amounts of minerals that may be present.

(e) Then, a selected amount of the anhydrous skim milk powder solids is placed into a ribbon blender.

(f) A selected amount of the anhydrous recoverable fat constituent is heated to a temperature above 40° C., which is its melting point, and is thereby rendered into anhydrous oil.

(g) The selected amount of heated anhydrous oil from step (f) is slowly added into the ribbon blender, over time. During that time, the anhydrous skim milk powder and the anhydrous oil are slowly agitated as the oil is added into the blend within the ribbon blender.

(h) The selected amount of anhydrous skim milk powder and the selected amount of anhydrous oil are continuously agitated, until they are thoroughly blended together.

(i) Then, the blended mixture is removed from the ribbon blender and is permitted to cool down at least to room temperature. It may also be cooled in the ribbon blender, as noted above. Thus, the anhydrous oil is again permitted to substantially solidify as anhydrous fat; the blended mixture takes on the appearance of a cakey powder.

(j) Finally, the blended mixture is set aside for use as dry whole milk powder; and, as noted, substantially all of the anhydrous fat constituent of that dry whole milk powder is recoverable as fat.

The following discussion is particularly directed to the principal purposes for which the anhydrous whole milk powder of the present invention is directed; namely, for use in the production of milk chocolate by chocolate manufacturers.

First, care should always be taken to reduce the risk of oxidation of the anhydrous butter fat constituent that is first removed from the whole milk and stored in the tank 22, and subsequently. This may require that, especially step (c) noted above, is carried out in such a manner that contact of the anhydrous recoverable fat constituent with air or oxygen is substantially precluded. Thereafter, particularly as the bags 38 of the end product are prepared, stored, and handled, it is advisable that they be stored and handled at low temperatures, usually less than 15° C. This also substantially precludes, or at least very significantly inhibits, risk of oxidation of the anhydrous fat constituent. The risk of microbiological activity is relatively low, if not substantially precluded, due to the anhydrous nature of the dry whole milk powder product of the present invention.

Particularly when the end user is a chocolate maker, certain chemical and physical standards for the equivalent dry-whole milk powder that is produced by the present invention may be established. For example, the chocolate maker may require a very specific quantity or amount of phospholipid or lecithin to be included in the anhydrous milk powder. Although lecithin is already found in milk, in small amounts, the chocolate maker may require, say, that there be specifically 0.25% phospholipid or lecithin constituent. By simple testing, in the first instance, a calculation may be made to add a very small amount of phospholipid or lecithin to any batch being made, so as to have the required constituent.

Moreover, it is quite possible in keeping with the present invention either to substitute or to add compatible vegetable oils to the anhydrous milk powder of the present invention, as may be determined by the chocolate maker. In general, the anhydrous recoverable fat constituent may have up to about 30% by weight thereof of a compatible vegetable oil, provided that the compatible vegetable oil has substantially similar physical characteristics as to its solid fat index (SFI) curve. More particularly, the compatible vegetable oil must be chosen so that, together with the butter fat constituent of the anhydrous milk powder of the present invention, a eutectic formation with respect to the total fat content of milk chocolate when the milk chocolate is being manufactured, must be avoided.

It is also to be noted, as is well known, that butter fat constituents of whole milk may vary from season to season, and between different breeds of dairy cattle, or even different herds of the same breeds of dairy cattle. For example, whole milk produced during the summer from Holstein or Guernsey cattle may have approximately 3% fat constituent, whereas the whole milk produced by Jersey cattle who are gazed in the same geographic area and at the same season may have up to 6% fat constituent. Thus, the anhydrous recoverable fat constituent as it is stored in tank 22 may be blended from a variety of extracted butter fat constituents that come from various sources of unhomogenized whole milk as they are derived from a plurality of different breeds of dairy cattle, or different herds of dairy cattle, or both.

Still further, as noted, there may be up to 30% by weight thereof of compatible vegetable oil added to the anhydrous recoverable fat constituent, no matter what its source and no matter what its blend, provided that a eutectic formation with respect to the total fat content of milk chocolate is avoided.

It is clear that the precise amount of recoverable butter fat constituent of the dry whole milk powder that is produced in keeping with the present invention is determined by the amounts of anhydrous skim milk powder and the anhydrous recoverable fat constituent that are chosen to be placed in the ribbon blender in the first instance. This is because the butter fat constituent is entirely recoverable as it enters into the fat system of milk chocolate during its manufacture.

Indeed, typically the anhydrous whole milk powder of the present invention is manufactured by blending 720 pounds of skim milk powder together with 280 pounds of anhydrous fat constituent, to arrive at 1,000 pounds of blended, cakey anhydrous whole milk powder.

It also follows that, if necessary and if appropriate, so as to satisfy the particular requirements of the chocolate maker, any of the variety of extracted butter fat constituents and the compatible vegetable oil, if used, may be fractionated before they are blended with each, so as to conform to a chosen SFI curve. Accordingly, they will therefore exhibit a high degree of crystalline compatibility and hardness compatibility with cocoa butter, as they enter into the fat system of the milk chocolate that is being manufactured.

Finally, the chocolate maker is very often concerned with the question of fat bloom, which may be caused by many factors such as exposure to high heat, or if the radical fat behaviour or crystallization pattern of the various fats within the fat system is not in the same phase as the other fats in the fat system. By the products and processes of the present invention, the entire fat system available to the chocolate maker is available for proper tempering. This permits the chocolate maker to produce product having a good eating quality and good snap, as well as excellent bloom resistance.

In general, the butter fat is compatible with cocoa butter, so as to not present radical fat crystals which would orient themselves into a crystal phase not compatible with the balance of the fat system being utilized in the milk chocolate. Thus, surface bloom by which a white or grey sheen appears at the surface of the chocolate, may be precluded. Moreover, since the tempering qualities of the fats may be essentially the same, greater control over tempering and thereby increased resistance to bloom can be effected.

Finally, it is also possible that the total fat percentage utilized by the chocolate maker in the product of milk chocolate may, in fact, be reduced. This occurs not only since there is no bound fat, nor the requirement to conch or refine the product so as to release bound fat, but greater distribution and lubrication within the chocolate product is achieved. It has been remarked that milk chocolate, in particular, is a suspension of the milk solids, sugar, and other solids within a finely divided fat system; and, when all of the fat is available, the total amount of fat used to render the specific milk chocolate properties may be reduced. This, in turn, may reduce the cost of production of milk chocolate, since generally the fat content of milk chocolate is the most expensive ingredient thereof.

Other modifications and alterations may be used in the design and manufacture of the apparatus of the present invention without departing from the spirit and scope of the accompanying claims.

What is claimed is:

1. A method for production of dry milk powder having a fat content equivalent to that of dry whole milk, wherein substantially all of the fat content is recoverable as fat when said dry milk powder is blended as dry whole milk powder into milk chocolate or dry baking mixes; said method comprising the steps of:
    (a) obtaining unhomogenized whole milk having butter fat, water, lactose, and protein constituents;
    (b) extracting the butter fat as anhydrous fat from the whole milk so as to leave said water, lactose, and protein constituents thereof as skim milk;
    (c) storing said extracted butter fat at temperatures below 40° C.;
    (d) drying said skim milk by removing all the available free water therefrom, thereby leaving anhydrous skim milk powder solids comprising said lactose and protein constituents, and any bound water remaining in said lactose and protein constituents;
    (e) placing a selected mount of said anhydrous skim milk powder solids into a ribbon blender;
    (f) heating a selected amount of said extracted butter fat to a temperature above 40° C. so as to render said extracted butter fat into a liquid oil;
    (g) adding said selected amount of heated liquid oil into said ribbon blender, over time, while slowly agitating said anhydrous skim milk powder and said heated oil as it is added thereto;
    (h) continuing to agitate said selected amount of anhydrous skim milk powder and said selected amount of liquid oil until they are a thoroughly blended mixture while permitting said blended oil and skim milk powder mixture to cool;
    (i) removing said blended mixture from said ribbon blender; and
    (j) setting aside said blended mixture for use as dry whole milk powder from which substantially all of said fat content in said dry whole milk powder is recoverable as fat.

2. The method of claim 1, wherein the step of extracting said butter fat from said whole milk is carried out using a centrifuge.

3. The method of claim 1, wherein the step of extracting said butter fat from said whole milk is carried out using a mechanical fat-phase separator.

4. The method of claim 1, wherein step (c) is carried out in such a manner that contact of said extracted butter fat with air or oxygen is substantially precluded.

5. The method of claim 1, wherein step (d) is carried out using a roller dryer.

6. The method of claim 1, wherein step (d) is carried out using spray drying techniques.

7. The method of claim 1, wherein the ribbon blender used in steps (e), (g), (h), and (i) is equipped with spray nozzles, and step (g) is carried out by spraying said heated oil into said ribbon blender.

8. The method of claim 1, wherein said extracted butter fat is blended from a variety of extracted butter fats coming from various sources of unhomogenized whole milk, so that said extracted butter fat may be derived from a plurality of different breeds of dairy cattle, or different herds of dairy cattle, or both.

9. The method of claim 8, wherein any of said variety of extracted butter fats may be fractionated before being blended so as to conform to a chosen solid fat index curve, and so as to exhibit a high degree of crystalline compatibility and hardness compatibility with cocoa butter.

10. The method of claim 1, wherein said unhomogenized whole milk initially comprises about 88%±3% by weight of water, about 3.8%±1% by weight of lactose, about 5.2%±1.2% by weight of protein, and about 3.0% to 6.0% by weight of butter fat; and wherein said dry whole milk powder from which substantially all of the fat content thereof is recoverable, comprises from not less than 26% nor more than 40% by weight of butter fat, from 0% up to about 4% by weight of bound water which is bound into the protein constituent of said dry whole milk powder, with the balance of up to 74% by weight being dry non-fat skim milk solids including milk proteins, lactose, and trace amounts of minerals.

11. The method of claim 10, wherein the precise amount of butter fat content of said dry whole milk powder is determined by the amounts of anhydrous skim milk powder and extracted butter fat chosen in steps (e) and (f), respectively.

* * * * *

UNITED STATES PATENT AND TRADEMARK OFFICE
CERTIFICATE OF CORRECTION

PATENT NO.    : 5,672,373
DATED         : Sept. 30, 1997
INVENTOR(S)   : Van Miller It is certified that error appears in the above-identified patent and that said Letters Patent is hereby corrected as shown below:

On the title page, item [54] and col. 1, line 2 in the title, "Power" should read --Powder--.

Signed and Sealed this

Tenth Day of February, 1998

Attest:

BRUCE LEHMAN

Attesting Officer        Commissioner of Patents and Trademarks